(12) United States Patent
Apodaca (10) Patent No.: US 10,558,496 B2
(45) Date of Patent: *Feb. 11, 2020

(54) TECHNIQUES FOR ACCESSING A GRAPHICAL PROCESSING UNIT MEMORY BY AN APPLICATION

(71) Applicant: INTEL CORPORATION, Santa Clara, CA (US)

(72) Inventor: Michael Apodaca, Folsom, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/865,114

(22) Filed: Jan. 8, 2018

(65) Prior Publication Data

US 2018/0293106 A1 Oct. 11, 2018

Related U.S. Application Data

(63) Continuation of application No. 13/530,250, filed on Jun. 22, 2012, now Pat. No. 9,864,638.

(51) Int. Cl.
G09G 5/39 (2006.01)
G06F 9/50 (2006.01)
G06F 12/1009 (2016.01)

(52) U.S. Cl.
CPC ........ G06F 9/5016 (2013.01); G06F 12/1009 (2013.01); G09G 5/39 (2013.01); G06F 9/5044 (2013.01); Y02B 70/16 (2013.01); Y02D 10/22 (2018.01)

(58) Field of Classification Search
None
See application file for complete search history.

(56) References Cited

U.S. PATENT DOCUMENTS

| | | | | |
|---|---|---|---|---|
| 5,913,230 A | * | 6/1999 | Richardson | G06F 9/4843 711/173 |
| 5,914,727 A | * | 6/1999 | Horan | G06F 12/0292 345/503 |
| 6,842,180 B1 | * | 1/2005 | Maiyuran | G06F 12/0862 345/541 |
| 7,065,630 B1 | * | 6/2006 | Ledebohm | G06F 12/1081 710/8 |
| 2003/0061450 A1 | * | 3/2003 | Mosur | G06F 12/0804 711/135 |
| 2005/0182906 A1 | * | 8/2005 | Chatterjee | G06F 11/201 711/144 |
| 2010/0293320 A1 | * | 11/2010 | Li | G06F 12/0246 711/103 |

* cited by examiner

*Primary Examiner* — Joni Richer (57) ABSTRACT

Various embodiments are presented herein that may allow an application direct access to graphical processing unit memory. An apparatus and a computer-implemented method may include accessing allocated graphical processing unit memory of a second resource via a link from a first resource. The allocated graphical processing unit memory may be mapped into one or more page tables of a central processing unit. A virtual address of the graphical processing unit memory from the one or more page tables of the central processing unit may be sent to the application.

23 Claims, 7 Drawing Sheets

TECHNIQUES FOR ACCESSING A GRAPHICAL PROCESSING UNIT MEMORY BY AN APPLICATION

CROSS-REFERENCE TO RELATED APPLICATION(S)

This application is a continuation of, claims the benefit of, and claims priority to U.S. patent application Ser. No. 13/530,250 filed on Jun. 22, 2012, the subject matter of which is incorporated herein by reference in its entirety.

BACKGROUND

Application programming interfaces enable software programs to communicate with one another. Through the use of dynamic link libraries, application programming interfaces may perform multimedia tasks such as game programming and video programming. Because the application programming interfaces may be platform independent, they may allow a programmer to quickly access three dimensional graphics and sounds to create a computer game, for example, without specific knowledge of the underlying hardware in the computing device.

A computing platform may create a collection of application programming interfaces. For example, Microsoft® Corporation provides a collection of application programming interfaces called DirectX® which are often used for multimedia tasks on Microsoft® platforms. The application programming interfaces in DirectX® are designed to copy data from the graphical processing unit memory to a resource. The application may then access the copied data via the resource. While this model is beneficial for discrete graphical processing units with local memory, the model is wasteful in integrated graphical processing units. Graphical processing units with unified memory architecture have all the resources stored in the same memory and therefore the copying of resources potentially wastes memory, performance and power. Accordingly, there may be a need for improved techniques to solve these and other problems.

DETAILED DESCRIPTION

Embodiments are generally directed to memory management techniques. Some embodiments are particularly directed to memory management techniques arranged to allow an application to directly access graphical processing unit memory. In one embodiment, for example, a set of application program interfaces may be designed or modified to allow an application to access data stored in a memory of a graphical processing unit without first copying the data to another memory unit. This reduces a number of memory copies needed to access graphical processing memory, which leads to more efficient memory management overall.

A computing platform may include multiple processing units such as a central processing unit and a graphical processing unit. A central processing unit executes instructions by performing basic arithmetical and logical operations. A graphical processing unit manipulates and alters memory to accelerate creation of images which can be output to a display. The graphical processing unit and the central processing unit may each include a memory region. The graphical processing unit memory may include physical memory that is allocated from the graphical processing unit's memory region and mapped into the graphical processing unit's page tables. Memory from the processing units may be allocated using resources.

A resource is an area of memory or memory unit that is created and used in application programming models. A resource may include storage such as a data structure or memory array. Resources may include, but are not limited to, vertex buffers, index buffer, constant buffer, textures, and shader resources. A resource may be created in memory. For example, a resource may be created in system memory, video memory or any other type of memory.

An application may utilize resources for creating or updating multimedia information. For instance, applications may be used for programming games and/or videos. An application may use a set of application program interfaces in order to create and/or access resources containing multimedia information for use by the application. For example, Microsoft® has a collection of application programming interfaces called DirectX® which are often used for multimedia applications on Microsoft® platforms. Although some embodiments may be described in a context of DirectX® by way of example, any application programming interfaces may be modified utilizing the techniques described herein. The embodiments are not limited in this context.

An application programming interface can create a resource which is allocated from central processing unit memory. A resource which can be directly accessed by the central processing unit is called as staging resource. Alternatively, an application programming interface may create a resource which is allocated from graphical processing unit memory. A resource which can be directly accessed by the graphical processing unit is called a non-staging resource.

Currently, when a resource is allocated memory from one of the processing units, the other processing unit may not directly access the memory data from that resource. In order to access the memory data, the memory data is copied into a new resource. For example, the DirectX® application programming interfaces may create a non-staging resource. The non-staging resource may store information from the graphical processing unit memory. However, an application may not access the stored memory data from the graphical processing unit memory in the non-staging resource. Instead, the DirectX® application programming interface may create a staging resource in order for the application to access the stored memory data from the graphical processing unit memory. The stored memory data from the graphical processing unit memory may be copied into the staging resource. The application can then access the stored memory data from the graphical processing unit memory in the staging resource through the central processing unit.

The copying of the graphical processing unit memory from one resource to another is wasteful in an integrated graphical processing unit with a unified memory architecture. As all the resources are stored in the same memory, the copying of information from one resource to another wastes graphical processing unit cycles and power.

The embodiments described herein build upon the current application programming interfaces of DirectX®, among other application programming interfaces, to allow an application to directly access the graphical processing unit memory. Currently, at least three DirectX® application programming interfaces are used to allow an application to have access to graphical processing unit memory. The three application programming interfaces are: (1) a create resource application programming interface; (2) a resource copy application programming interface; and (3) a map staging resource application programming interface. By using the same application names and providing new functions to the applications and the application programming interfaces, an application programming model may be improved with little if any changes to applications designed to utilize such application program interfaces. Programmers may use the same application to create programs while memory may be used more efficiently as fewer resources are wasted and power may be conserved.

Accordingly, various embodiments describe modifying existing application programming interfaces to allow an application direct access to the non-staging resources allocated with graphical processing unit memory. By modifying DirectX® application programming interfaces, graphical processing unit cycles and power may be saved without a programmer needing to learn new terminology. In the embodiments described herein, a programmer can use the same application names and application programming interfaces while allowing the application to determine the memory architecture and create resources which most efficiently preserve power and performance.

In an embodiment, an apparatus may include a processor circuit and a graphics driver operative on the processor circuit to allow an application direct access to a resource allocated with graphical processing unit memory. The graphics driver may be operative to implement a create resource application programming interface. The create resource application programming interface may receive from the application a request for direct access to the graphical processing unit memory. Based on information from the application, the graphics driver may designate first and second resources as shared resources. A first resource may comprise, for example, a staging resource. A second resource may comprise, for example, a non-staging resource. By marking the first and second resources as shared resources, the graphics driver may indicate that an application requested direct access to the resources allocated with the graphical processing unit memory.

The create resource application programming interface may allocate graphical processing unit memory for the second resource. However, the create resource application programming interface may not allocate graphical processing unit memory for the first resource. Instead, the graphics driver may be operative to implement a resource copy application programming interface to create a pointer in the first resource to the second resource when the resources are designated as shared.

The graphics driver may be operative to implement a map staging resource application programming interface to follow the pointer from the first resource to the allocated graphical processing unit memory of the second resource. The graphics driver may be further operative to implement the map staging resource programming interface to map the allocated graphical processing unit memory of the second resource into one or more page tables in the central processing unit and send a virtual address of the graphical processing unit memory from the one or more page tables of the central processing unit to the application. The graphics driver may send to the application a virtual pointer with the virtual address of the graphical processing unit memory. The application may then access data stored at the virtual address of the graphical processing unit memory utilizing the virtual pointer. In this manner, the graphics driver may allow the application to directly access data stored in the graphical processing unit memory.

The embodiments described herein may provide several advantages over conventional application program interfaces. By allowing the application direct access to graphical processing unit memory, memory is used more efficiently as fewer resources are wasted. A more efficient memory allocation may increase the application speed. Additionally, allowing the application direct access to the graphical processing unit memory may also conserve power as there are fewer wasted graphical processing unit cycles. Reduced power consumption may be especially advantageous when the system is operating on battery power because it can extend the life of the battery.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
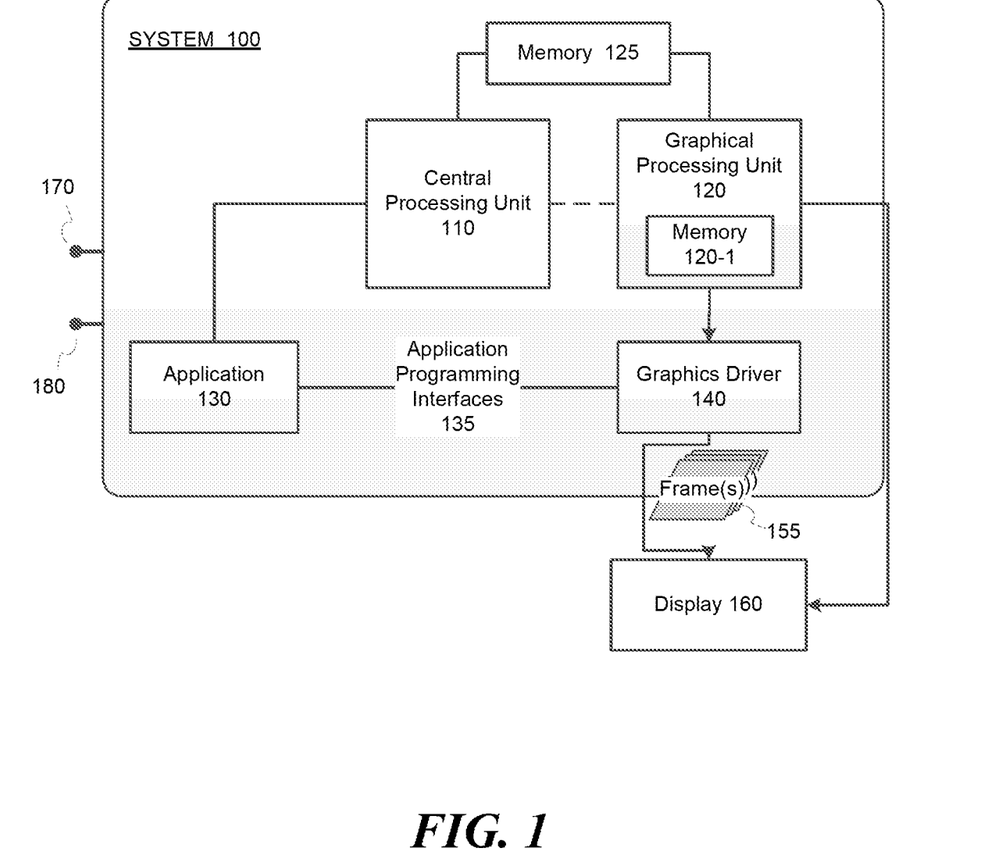
FIG. 1 illustrates a block diagram of a system.

FIG. 1 illustrates a system 100 implementing an exemplary computing platform. The system 100 may include a processor circuit denoted as central processing unit 110, a processor circuit denoted as graphical processing unit 120, and memory 125.

A central processing unit 110 may execute instructions by performing the basic arithmetical and logical operations. The graphical processing unit 120 may manipulate and alter memory to accelerate the creation of images available for output to a display.

The graphical processing unit 120 may include a graphical processing unit memory 120-1. The graphical processing unit memory 120-1 is the physical memory that is allocated from the graphical processing unit's memory region. The graphical processing unit memory 120-1 may be mapped into the graphical processing unit's page tables. In an embodiment, the graphical processing unit memory 120-1 may be located on the same die or chip as the graphical processing unit 120 or the graphical processing unit memory 120-1 may be separate from, but accessible to, the graphical processing unit 120.

An application 130 may include one or more functions for creating or updating multimedia. Application 130 may be used for programming games, such as a three dimensional game, and/or videos. For example, an application 130 may include a task or function, such as, but not limited to, a two dimensional texture application, a three dimensional texture application, a sound effect application and a shading application.

The system 100 may further include a graphics driver 140. In operation, an application 130 may call the graphics driver 140 to present frame(s) 155 of video content. The application 130 may call the graphics driver 140 using one or more application programming interfaces 135. An application programming interface 135 may be used to communicate between the application 130 and the graphics driver 140.

The graphics driver 140 may then handle the presenting of a frame 155 to a display 160. The frame presentation may or may not involve the graphical processing unit 120. The system 100 may be powered by either alternating current 170 or battery power 180. The system 100 may also be communicatively coupled with the digital display 160.

Figure 2:
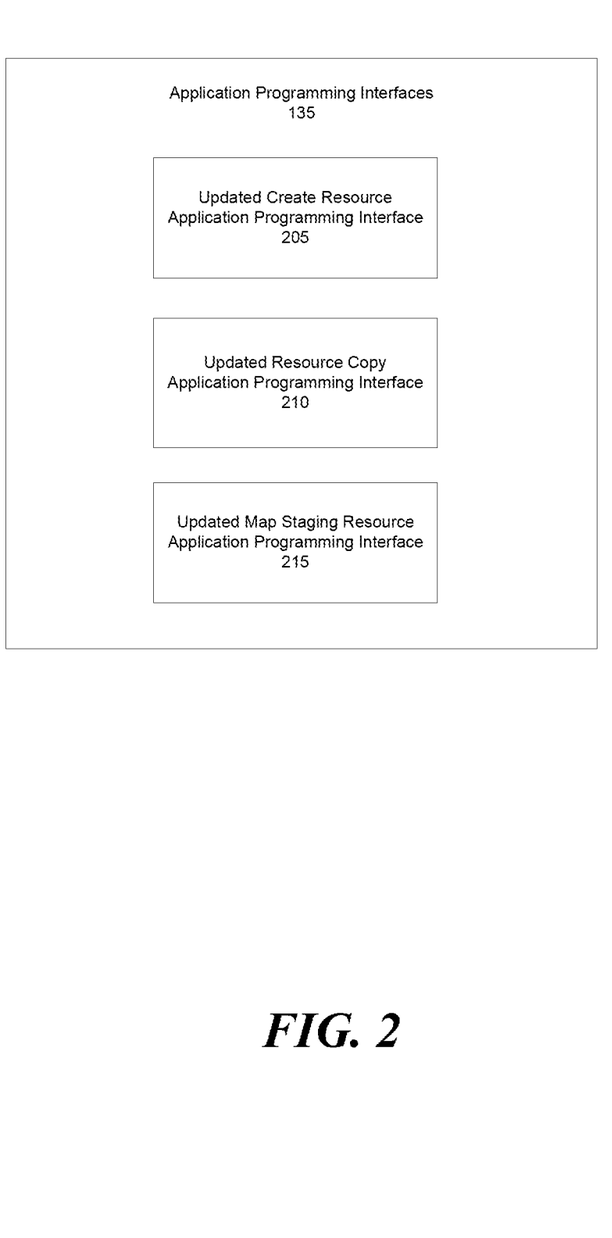
FIG. 2 illustrates one embodiment of a plurality of application programming interfaces.

FIG. 2 illustrates an embodiment of a plurality of updated application programming interfaces called by the application 130. The application programming interfaces currently used in the set of DirectX® application programming interfaces create a resource to store information from a graphical processing unit 120 and provide the stored information to the central processing unit 110. However, the application 130 cannot directly access these resources allocated with graphical processing unit memory 120-1. The updated application programming interfaces 135 are modified to work within the preexisting DirectX® framework and/or other platforms, such as but not limited to OpenGL®, to create resources which allow the application 130 direct access to the graphical processing unit memory 120-1. For example, the updated application programming interfaces 135 may be used and work with DirectX10. The updated application programming interfaces 135 may replace the conventional application programming interfaces currently in use.

In an embodiment, the application 130 may use one or more updated application programming interfaces 135 in order to communicate with the graphics driver 140. The updated application programming interfaces 135 may include an updated create resource application programming interface 205, an updated resource copy application programming interface 210 and an updated map staging resource application programming interface 215. For example, these updated application programming interfaces 135 may be used with the DirectX® application programming model to allow an application 130 direct access to the graphical unit processing memory 120-1.

For example, an application 130 may request that a resource be created by the graphics driver 140 using the updated create resource application programming interface 205. The updated create resource application programming interface 205 may create a resource.

The application 130 may send multiple requests to the graphics driver 140 so that multiple resources are created using the updated create resource application programming interface 205. For example, each updated create resource application programming interface 205 may create a single resource. For two resources to be created, the updated create resource application programming interface 205 may be called twice by the application 130.

Figure 3:
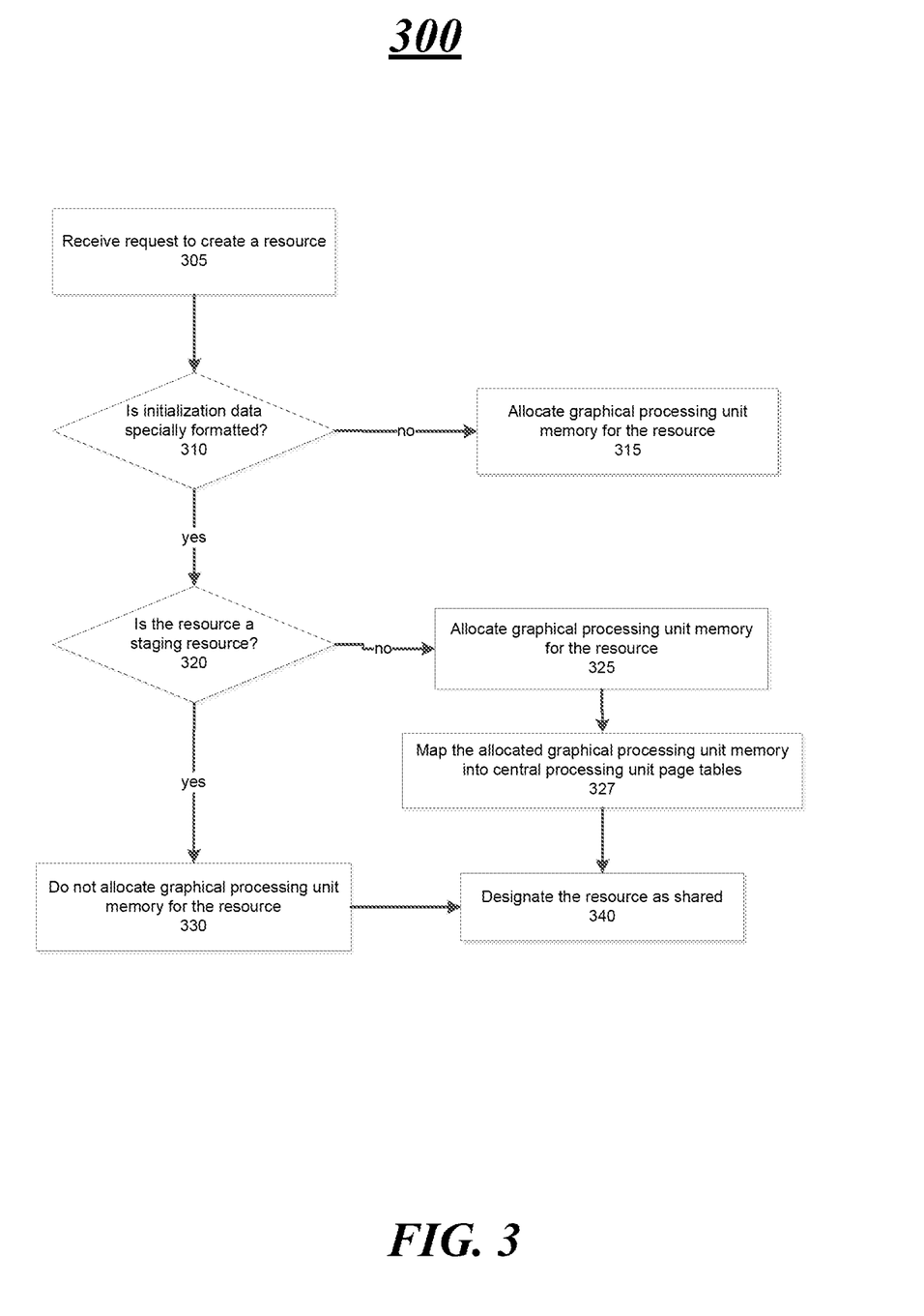
FIG. 3 illustrates one embodiment of a first logic flow.

FIG. 3 illustrates one embodiment of a logic flow 300 in which a resource is created. Included herein are one or more flow charts representative of exemplary methodologies for performing novel aspects of the disclosed architecture. While, for purposes of simplicity of explanation, the one or more methodologies are shown herein in the form of a flow chart or flow diagram and are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

In an embodiment, the logic flow 300 may send a request to create a resource at block 305. The request may be sent from the application 130 to the graphics driver 140 in the form of an application programming interface 135. In an embodiment, two different resources may be created. The application 130 may send a first request, via the updated create resource application programming interface 205, to create a resource. For example, the request may cause the graphics driver 140 to create a staging resource. A staging resource is a commonly created resource using DirectX®. Currently, a staging resource in DirectX® stores data from the graphical processing unit 120 for access by the central processing unit 110 and the application 130.

The logic flow 300 may determine whether the initialization data is specially formatted at block 310. The request sent by the application 130 to the graphics driver 140 may include initialization data specially formatted to indicate that the application 130 is requesting direct access to the graphical unit processing memory 120-1. For example, specially formatted data may include data with one or more flags, data with a particular type of encryption, data in the packet header or other methods by which the graphics driver 140 determines the type of access requested by the application 130.

In an embodiment, when the initialization data is not specially formatted, the logic flow 300 may allocate graphical processing unit memory for the resource at block 315. As discussed above, graphical processing unit memory 120-1 may be physical memory that is allocated from the memory region of the graphical processing unit and can be mapped into the graphical processing unit's page tables. For example, in the DirectX® application programming model, when a resource is created, memory from the graphical processing unit 120 may be allocated for the resource. If the initialization data is not specially formatted, then the creation of the resource can follow the current process of allocating graphical processing unit memory 120-1 for the resource as the application 130 does not need direct access to the graphical processing unit memory 120-1.

When the initialization data is specially formatted, the logic flow 300 may determine whether the resource is a staging resource at block 320. The graphics driver 140 may create a staging resource or a non-staging resource based on the request of the application 130. For example, using the updated create resource application programming interface 205, a staging resource may be created using the framework of DirectX®. DirectX® currently creates a staging resource in order to store information, such as graphical processing unit memory. DirectX® currently allows the staging resource to be accessed by the central processing unit 110. In another example, using the updated create resource application programming interface 205, a non-staging resource may be created using the framework of DirectX®. In one embodiment, a non-staging resource is any resource created that is not a staging resource. DirectX® currently defaults to creating non-staging resources. Currently, non-staging resources are allocated graphical processing unit memory 120-1 and most non-staging resources cannot be directly accessed by an application 130.

When the application 130 passes specially formatted initialization data to the graphics driver 140 and the resource is a staging resource, the logic flow 300 may not allocate graphical processing unit memory 120-1 for the staging resource at block 330. Unlike the current DirectX® create resource application processing interface, the updated create resource application programming interface 205 may determine that the initialization data was specially formatted and therefore stop the staging resource from being allocated in graphical processing unit memory 120-1. By aborting the allocation of the graphical processing unit memory 120-1, the staging resource may be used in subsequent updated application programming interfaces 135 to provide the application 130 with direct access to the non-staging resources allocated with the graphical processing unit memory 120-1.

The logic flow 300 may determine that the resource is a non-staging resource at block 320. The application 130 may request that the graphics driver 140 create a non-staging block 340. For example, the application 130 may send a first request to the graphics driver 140 to create a staging resource. The application 130 may send the graphics driver 140 specially formatted initialization data to create a shared staging resource. In another example, the application 130 may send a second request to the graphics driver 140 to create a non-staging resource. The application 130 may send the graphics driver 140 specially formatted initialization data to create a shared non-staging resource. By designating the staging and the non-staging resources as shared, the graphics driver can use the staging and non-staging resources to allow the application 130 direct access to the graphical processing unit's memory 120-1.

Exemplary pseudo-code for the embodiments described above may be as follows:

```
CreateResource( )
{
    // only create a resource if there is initialization data
    If (ResourceHasInitializationData( ) && IsInitializationDataExtension( ))
    {
        // if the resource is a shared resource
        If (GetExtensionType( ) == CPU_SHARED_RESORUCE)
        {
            // if the resource is a staging resource
            // If (IsStagingResource( ))
            {
                // if the resource is a shared resource and a staging resource, do not allocate
graphical processing unit memory as conventionally occurs in the creation of the
resource
                DoNotAllocateGPUMemory( )
            }
            else
            {
                // if the resource is a shared resource and not a staging resource, allocate
graphical processing unit memory as conventionally occurs in the creation of the
resource
                AllocateCPULockableMemory( )
            }
        }
    }
    else
        // if the resource is not shared, then proceed with the conventional creation of
the resource
        NormalOperation( )
}
``` resource. The application 130 may supply the graphics driver 140 with specially formatted initialization data to create the non-staging resource.

The logic flow 300 may allocate graphical processing unit memory 120-1 for the non-staging resource at block 325. Physical memory may be allocated from the graphical processing unit memory 120-1 for the non-staging resource. The updated create resource application programming interface 205 may continue with the process conventionally taught in DirectX® of allocating graphical processing unit memory 120-1. However, in the updated create resource application programming interface 205, only the non-staging resource may be allocated graphical processing unit memory.

The logic flow 300 may map the allocated graphical processing unit memory 120-1 of the non-staging resource into the central processing unit page tables 110 at block 327. The graphics driver 140 may request to an operating system that the non-staging resource is lockable so that the allocated graphical processing unit memory 120-1 of the non-staging resource can be mapped into the central processing unit 110 page tables.

The logic flow 300 may designate the resources with specially formatted initialization data as shared resources at Referring back to FIG. 2, after the application 130 requests the updated create resource application programming interface 205 twice, the application 130 may request the updated resource copy application programming interface 210. As with the updated create resource application programming interface 205, the updated resource copy application programming interface 210 may be a known application programming interface. As the resource copy application programming interface is a known application programming interface, the application 130 may request the updated resource copy application programming interface 210 to the graphics driver 140 without any change to conventional operations. However, unlike the current resource copy application programming interface, the updated resource copy application programming interface 210 may allow the application 130 direct access to the graphical processing unit memory 120-1 when the staging and non-staging resources are designated as shared. For example, by using the updated resource copy application programming interface 210, a resource may be copied using the framework of DirectX®. DirectX® teaches copying the resource. If the staging resource and the non-staging resource are not designated as shared, then the updated resource copy application programming interface 210 may continue with the process conventionally taught in DirectX® to copy the resource. However, if the staging and non-staging resources are designated as shared, the updated resource copy application programming interface 210 may create a link between the staging resource and the non-staging resource. The linked resource may be used to provide the application 130 with direct access to the graphical processing unit memory 120-1.

Figure 4:
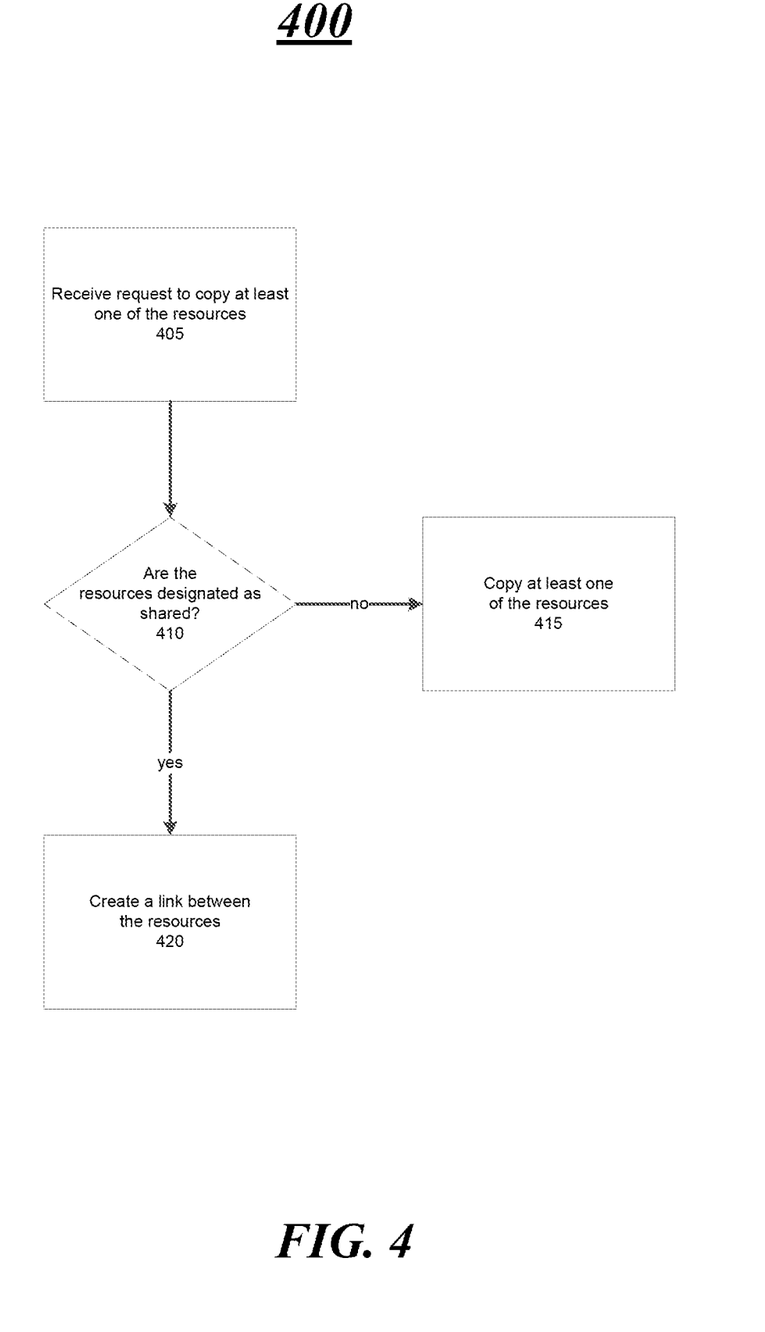
FIG. 4 illustrates one embodiment of a second logic flow.

FIG. 4 illustrates one embodiment of a logic flow 400 in which a staging resource is bound to a non-staging resource according to embodiments of the invention. The logic flow 400 may be representative of some or all of the operations executed by one or more embodiments described herein. In the illustrated embodiment shown in FIG. 4, the logic flow 400 may request that the graphics driver 140 copy one of the resources at block 405. The application 130 may send the request via an application programming interface to copy at least one of the resources. The application 130 may request that the staging resource and/or the non-staging resource be copied.

In an embodiment, the logic flow 400 may determine whether the resources are designated as shared at block 410. The resources may be the staging resource and the non-staging resource created during the updated create resource application programming interface 205. As discussed above, the staging resource and the non-staging resource may be designated as shared by the application 130. In some embodiments, the resource may be designated as shared based on the specially formatted initialization data.

The logic flow 400 may copy the one or more resources when the resource is not designated as shared at block 415. For example, the copying of the resource may be the current or conventional process for the DirectX® resource copy application programming interface. If the resources are not designated as shared, then the resource copy application programming interface may continue with conventional operation of copying the resource. For example, the non-staging resource may be copied as the conventional process for the DirectX® resource copy application programming interface.

The logic flow 400 may create a link between the resources when the resources are designated as shared at block 420. Instead of copying a resource, the resources may be bound by a link. In an embodiment, the resources may be referred to as a source resource and a destination resource. The graphics driver 140 may create a link between the source resource and the destination resource. In other words, the graphics driver 140 may bind the source and the destination resources. For example, the staging resource may be the source resource and the non-staging resource may be the destination resource. The graphics driver 140 may create a link between the staging resource and the non-staging resource to bind the staging resource or the non-staging resource. In an alternate example, the staging resource may be the destination resource and the non-staging resource may be the source resource. The graphics driver 140 may create a link between the non-staging resource and the staging resource.

The link may be created by storing a pointer to the data structure representing the resources. For example, the graphics driver 140 may include data structures representing the staging resource and the non-staging resource. The data structure of the staging resource may store a pointer to the data structure of the non-staging resource. The pointer may be later used in the updated map staging resource application programming interface 215. By creating a link between the resources, the staging resource may be bound to the non-staging resource. In other words, the application 130, through the staging resource, may have direct access, via the pointer, to the non-staging resource which is allocated graphical processing unit memory 120-1. As a result, the application 130 may directly access, through the link between the staging resource and the non-staging resource, the graphical processing unit memory 120-1.

Exemplary pseudo-code for the embodiments described above may be as follows:

```
ResourceCopy( )
{
    // if the resources are designated as shared resources
    If (SourceResource->IsCPUShared( ) || DestinationResource → IsCPUShared( ))
    {
        // checking again if the resources are designated as shared resources and if the
destination resource is a staging resource
        If (SourceResource->IsCPUShared( ) && DestinationResource → IsCPUShared( )
&& DestinationResource->IsStagingResource)
        {
            // create a link between the destination resource and the source resource
            DestinationResource->Bind (SourceResource)
            {
                // if the resources are not designated as shared resources or the destination
resource is a staging resource, then there is an error
                else
                {
                InvalidApplicationError( )
                }
        // if the resources are not designated as shared, then proceed with conventional
copying of the resource
        else
        {
            NormalOperation( )
        }
```

Referring back to FIG. 2, the application 130 may request the updated map staging resource application programming interface 215. As with the updated create resource application programming interface 205 and the updated resource copy application programming interface 210, the updated map staging resource application programming interface 215 may be a known application programming interface. As the map staging resource application programming interface is a known application programming interface, the application 130 may request the updated map staging resource application programming interface 215 to the graphics driver 140 while maintaining compatibility with applicable graphics programming languages.

Using the updated map staging resource application programming interface, the graphics driver 140 may determine whether the resources are designated as shared. If a resource is not designated as shared, then the staging resource may be mapped as taught in the DirectX® conventional map staging resource application programming interface. If the resource is designated as shared, unlike the current map staging resource application programming interface which will not allow the application direct access to the graphical processing memory unit 130, the updated map staging resource application programming interface 215 may allow the application direct access to the graphical processing memory unit 130. The updated map staging resource application programming interface 215 may use the link from the staging resource to map the non-staging resource into one or more page tables of a central processing unit 110. The graphics driver may return a data structure containing a virtual pointer. The virtual pointer may include a virtual address to the graphical processing unit memory 120-1. By mapping the non-staging resource into one or more central processing unit 110 page tables, the application 130 may have direct access to the graphical processing unit memory 120-1.

Figure 5:
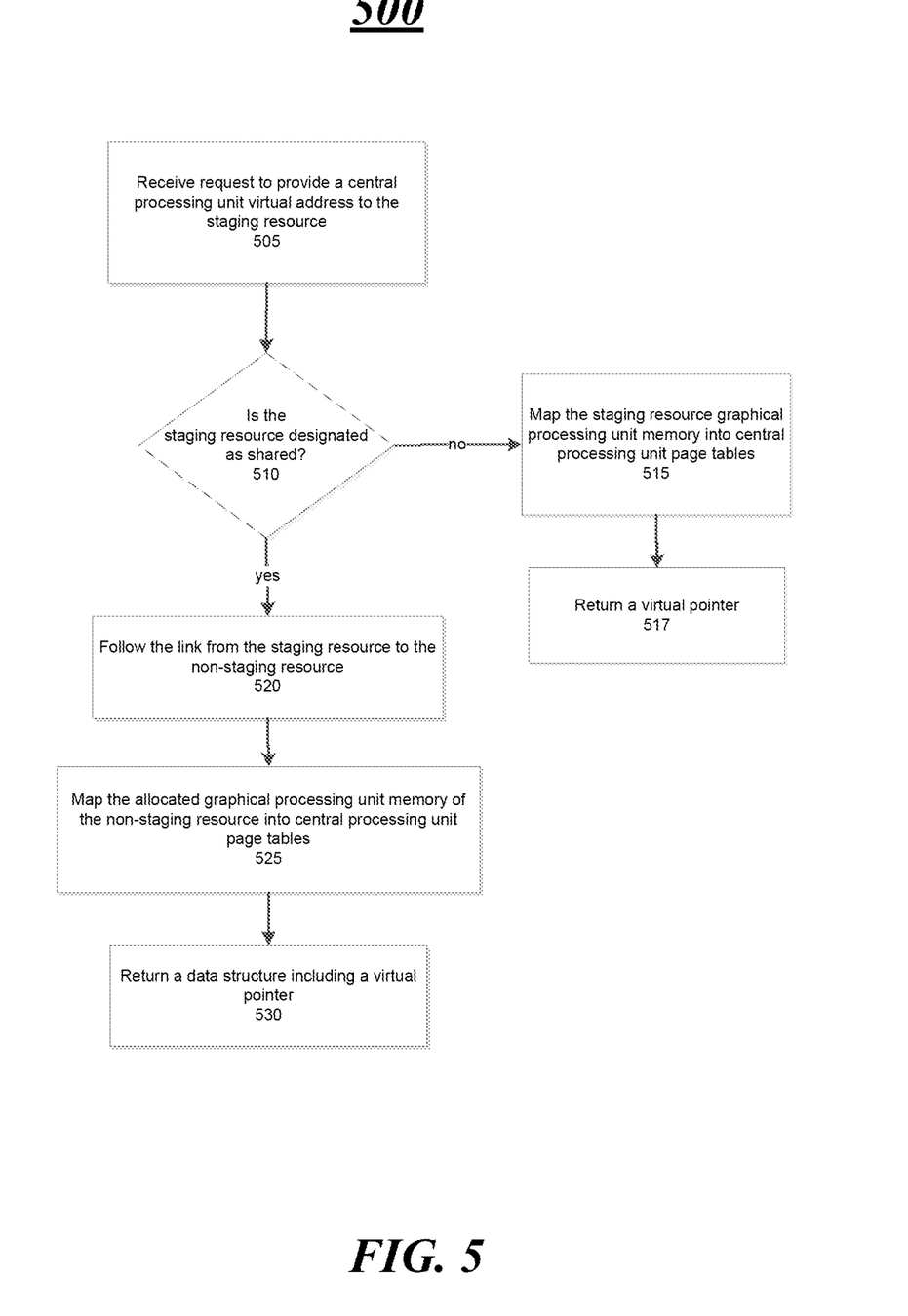
FIG. 5 illustrates one embodiment of a third logic flow.

FIG. 5 illustrates one embodiment of a logic flow 500 in which the updated map staging resource application programming interface 315 is requested. The logic flow 500 may be representative of some or all of the operations executed by one or more embodiments described herein. In an embodiment, the logic flow 500 may receive a request to provide a central processing unit 110 virtual address to the staging resource at block 505. Similar to the updated create resource application programming interface 205 and the updated resource copy application programming interface 210, the updated map staging resource application programming interface 215 may be called by the application 130. The application 130 may request a virtual address to the graphical processing unit memory 120-1 from the graphics driver 140.

In an embodiment, the logic flow 500 may determine whether the resource is designated as shared at block 510. As discussed in the updated create resource application programming interface 205, a resource may be designated as shared when the application 130 requests direct access to the graphical processing unit memory 120-1. The application 130 may determine whether the staging resource is shared as the staging resource may be mapped.

If the resource is not designated as shared then the logic flow 500 may map the graphical processing unit memory 120-1 allocated for the staging resource into central processing unit 110 page tables at block 515. For example, mapping the graphical processing unit memory 120-1 allocated for the staging resource into one or more page tables of the central processing unit 110 may be the conventional process for the current map staging resource application programming interface. As the resource is not designated as shared, mapping the graphical processing unit memory 120-1 allocated for the staging resource onto central processing unit 110 page tables may be sufficient as the application 130 did not request direct access to the graphical processing unit memory 120-1. For example, the computing system may include discrete memories and copying the allocated graphical processing unit memory 120-1 may not waste resources or power.

The logic flow 500 may return a virtual pointer at block 517 after the graphical processing unit memory 120-1 allocated for the staging resource is mapped into the central processing unit 110 page tables. As discussed above, since the resources are not designated as shared, the normal operation of the map staging resource application programming interface may occur and a virtual pointer may be returned. The virtual pointer may allow the application 130 to read the graphical processing unit memory 120-1 allocated to the staging resource. However, the virtual pointer does not allow the application 130 direct access to the graphical processing unit memory 130.

When the resource is designated as shared, the logic flow 500 may follow the link from the staging resource to the non-staging resource at block 520. For example, the link created during the updated resource copy application programming interface 210 may be used and the link may be followed from the staging resource to the non-staging resource. As discussed above, the staging resource may include a pointer to the non-staging resource and the non-staging resource may be allocated with graphical processing unit memory 120-1.

The logic flow 500 may map the allocated graphical processing unit memory 130 of the non-staging resource into central processing unit page tables 110 at block 525. The graphics driver 140 may map the allocated graphical processing unit memory 130 of the non-staging resource into page tables of the central processing unit 110. The mapping of the non-staging resource may occur because the staging resource, which is normally called for mapping, is empty and links to the non-staging resource. Because the resources were designated as shared, the updated map staging resource application programming interface 215 may link from the staging resource to the non-staging resource. The non-staging resource may include the allocated graphical processing unit memory 130.

As a result of the mapping, the logic flow 500 may return a data structure including a virtual pointer at block 530. Returning a data structure including a virtual pointer may allow the application 130 to directly access the graphical processing unit memory 120-1. The virtual pointer from the central processing unit 110 may include the virtual address of the graphical processing unit memory 120-1. For example, the graphics driver 140 may return from the central processing unit 110 a virtual address of the graphical processing unit memory 120-1. As a result of the virtual pointer including the virtual address, the application 130 may directly access the graphical processing unit memory 120-1.

As the graphical processing unit memory 120-1 format is different than the central processing unit memory 110, a data structure may be needed in order for the central processing unit 110 to provide a proper address of the graphical processing unit memory 120-1 to the application 130. For example, the graphical processing unit 120 may include tiled memory. So the data structure, including the virtual pointer, may be necessary in order for the central processing unit 110 to allow the application to read directly from the graphical processing unit memory 120-1.

For example, the non-staging resource may be allocated graphical processing unit memory 120-1 in the create resource application programming interface 205. However, the application 130 may not directly access the non-staging resource until the link was formed between the staging resource and the non-staging resource at the updated resource copy application programming interface 210. When the updated map staging resource application programming interface 215 was requested by the application 130, the link from the staging resource to the non-staging resource was followed and the allocated graphical processing unit memory 120-1 of the non-staging resource could be mapped into one or more central processing unit page tables. The central processing unit 110 may return the virtual address of the graphical processing unit memory 120-1 to the application 130. By allowing the application 130 direct access to the graphical processing unit memory 120-1, power and resource consumption may be reduced.

In an embodiment, the updated map staging resource application programming interface 215 may include the graphics driver 140 to determine whether a graphical processing unit cache needs to be flushed and/or invalidated. In an embodiment, the graphical processing unit 120 may have a graphical processing unit cache that stores data so that data may be quickly accessed. In an embodiment, the determination of whether the graphical processing unit cache needs to be flushed and/or invalidated may occur at the beginning of the updated map staging resource application programming interface 215. In an alternate embodiment, the determination of whether the graphical processing unit cache needs to be flushed and/or invalidated may occur prior to following the link from the staging resource to the non-staging resource. In yet another alternate embodiment, the determination of whether the graphical processing unit cache needs to be flushed and/or invalidated may occur at the end of the updated map staging resource application programming interface 215.

The application 130 may use read and/or write flags to inform the graphics driver 140 of whether any graphical processing unit caches need to be flushed and/or invalidated. For example, the graphics driver 140 may flush the graphical processing unit write cache to ensure that the data is removed from the graphical processing unit memory 120-1. As discussed before, the graphical processing unit memory 120-1 is the physical memory that is allocated from the graphical processing unit's memory region and can be mapped in the graphical processing unit's page tables. For example, the graphics driver 140 may invalidate the graphical processing unit cache in order to retain cache coherency. Retaining cache coherency of the graphical processing unit cache may ensure that the next time the graphical processing unit reads the cache the data will not be stale.

Exemplary pseudo-code for the embodiment described above may be as follows:

```
MapStagingResource( )
{
    // if the resource is designated as a shared resource
    If (Resource->IsCPUShared( ))
    {
        // if the GPU cache need to be written
        If (MapReadsResource && GPUWritesResource)
        {
            // flush the GPU write cache
            FlushGPUWriteCache( )
        {
        //map the resource
        Lock (Resource->Bound( ))
            // if the resource needs to be written to the central processing unit
            If (MapWritesResource && GPUReadsResource)
        {
        //write the resource to the central processing unit for cache coherency
        InvalidateGPUReadCache( )
        }
        // follow the link using the pointer from the staging resource to the non-staging
    resource, map the allocated graphical processing unit memory from the non-staging
    resource into central processing unit page tables, and return the data structure
    containing a virtual pointer.
            OutputPointer = CPUSharedResouceDataStructure
    }
    else
    {
        // if the resource is not designated as shared, then proceed with normal mapping of
    the resource
        NormalOperation( )
    }
```

Figure 6:
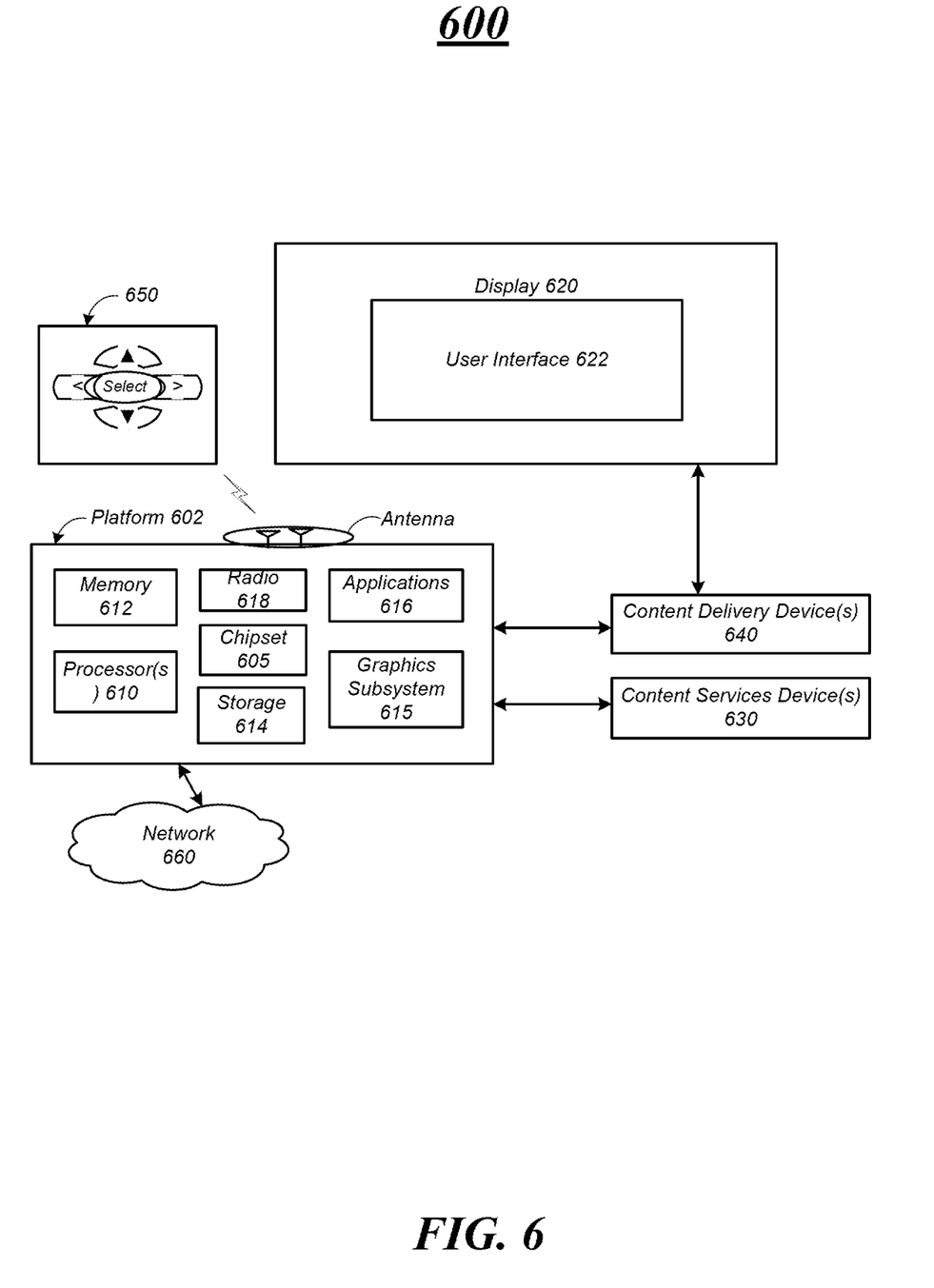
FIG. 6 illustrates an embodiment of a system.

FIG. 6 illustrates an embodiment of a system 600 that may be suitable for implementing the system of FIG. 1 of the disclosure. In embodiments, system 600 may be incorporated into a personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application programming interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these components is described in more detail below.

In embodiments, platform 602 may comprise any combination of a chipset 605, processor(s) 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor(s) 610 may be implemented as Complex Instruction Set Computer (CISC) or Reduced Instruction Set Computer (RISC) processors, x86 instruction set compatible processors, multi-core, or any other microprocessor or central processing unit. In embodiments, processor(s) 610 may comprise dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphical processing unit (GPU) 120 or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. For example, the radio may include a radio receiver. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, display 620 may comprise any television type monitor or display. Display 620 may comprise, for example, a computer display screen, touch screen display, video monitor, television-like device, and/or a television. Display 620 may be digital and/or analog. In embodiments, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In embodiments, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 receives content such as cable television programming including media information, digital information, and/or other content. Examples of content providers may include any cable or satellite television or radio or Internet content providers. The provided examples are not meant to limit embodiments of the invention.

In embodiments, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but integrated into platform 602 and/or display 620. Embodiments, however, are not limited to the elements or in the context shown or described herein.

In embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 6.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
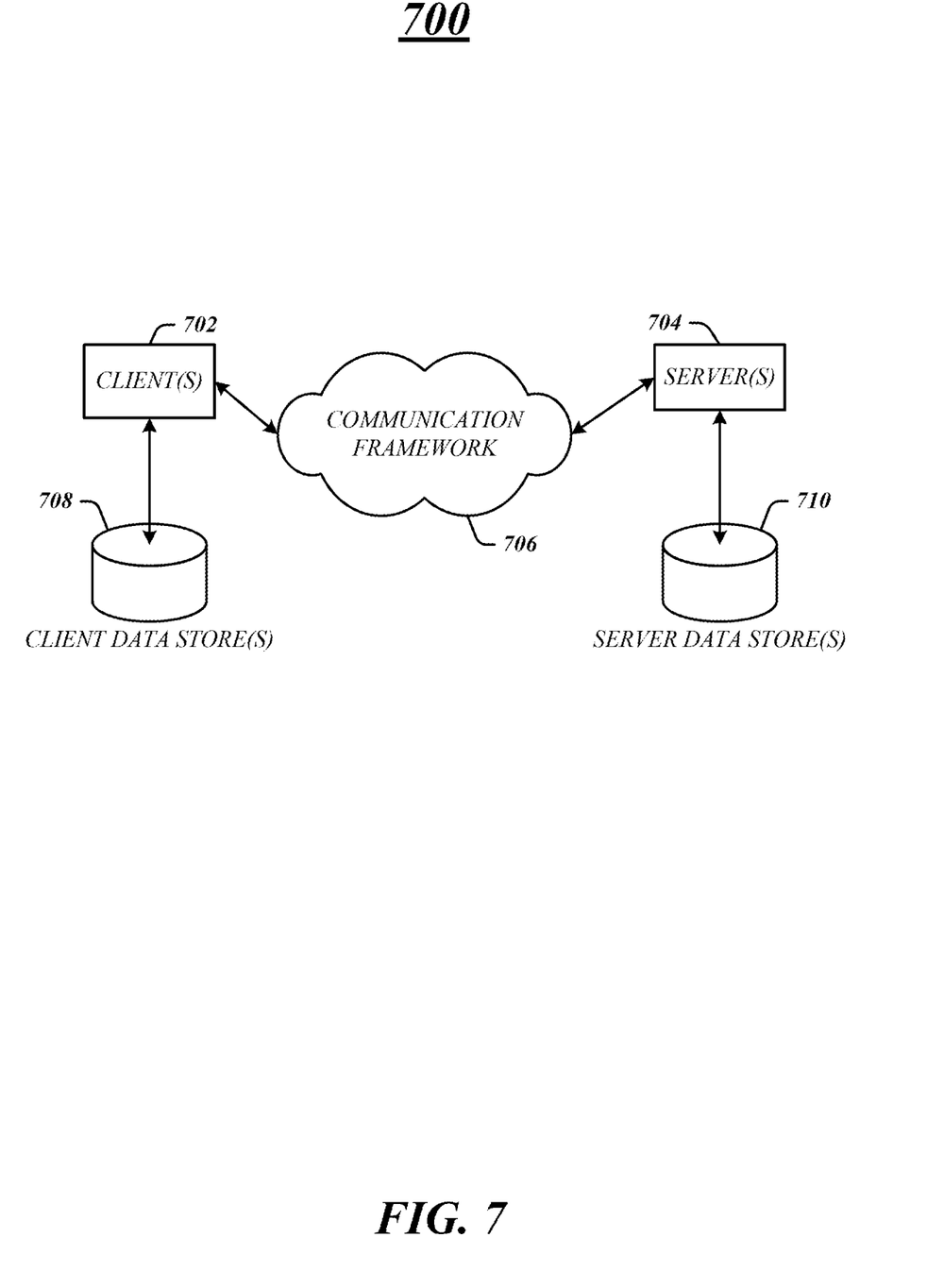
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application programming interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

In some embodiments, a computer-implemented method may include accessing allocated graphical processing unit memory of a second resource via a link from a first resource, mapping the allocated graphical processing unit memory into one or more page tables of a central processing unit, and sending a virtual address of a graphical processing unit memory from the one or more page tables of the central processing unit to an application.

In an embodiment, the first and second resource may be created to allow the application direct access to the graphical processing unit memory, the first and second resources comprising data structures. The graphical processing unit memory may be allocated for the second resource. A request may be received for the application to have direct access to the graphical processing unit memory. The first resource may include a staging resource and the second resource may include a non-staging resource. The first and second resources may be designated as shared resources. An allocation of the graphical processing unit memory for the first resource may be aborted when the first resource is a staging resource. A pointer to a data structure of the second resource to create the link may be stored in a data structure of the first resource. The virtual address of the graphical processing unit memory from the one or more page tables of the central processing unit may be received. It may be determined whether to flush a cache of the graphical processing unit memory based on one of a read and write flag and whether to invalidate a cache of the graphical processing unit memory based on one or of a read and write flag.

In various embodiments, an apparatus may include a processor circuit and a graphics driver operative on the processor circuit to allow an application direct access to a graphical processing unit memory. The graphics driver operative to implement one or more application programming interfaces comprising a create resource application programming interface to designate a first resource and a second resource as shared resources and allocate the graphical processing unit memory for the second resource, a resource copy application programming interface to create a pointer in the first resource to the second resource when the first and second resources are shared resources or a map staging resource application programming interface to follow the pointer from the first resource to the allocated graphical processing unit memory of the second resource, map the allocated graphical processing unit memory of the second resource into one or more page tables of the central processing unit and send a virtual address of the graphical processing unit memory from the one or more page tables of the central processing unit to the application.

In some embodiments, the graphics driver may be operative to implement the create resource application programming interface to determine whether initialization data for the second resource was specially formatted. The graphics driver may be operative to implement the create resource application programming interface to determine whether initialization data for the first resource was specially formatted. The graphics driver may be operative to implement the create resource application programming interface to abort an allocation of the graphical processing unit memory for the first resource. The graphics driver may be operative to implement the resource copy application programming interface to store, in a data structure of the first resource, a pointer to a data structure of the second resource. The graphics driver may be operative to implement the map staging resource application programming interface to receive a virtual pointer with the virtual address from one or more central processing unit page tables. The graphics driver may be operative to implement the map staging resource application programming interface to send a virtual pointer with the virtual address to the application. The graphics driver may be operative to implement the map staging resource application programming interface to determine whether to flush a cache of the graphical processing unit memory based on a flag. The graphics driver may be operative to implement the map staging resource application programming interface to determine whether to invalidate a cache of the graphical processing unit memory based on a flag. The apparatus may include a digital display operatively coupled to the processor circuit.

In an embodiment, an apparatus may include means for performing the method of creating a first and second resource, allocating graphical processing unit memory for the second resource, creating a link between the first resource and the second resource, mapping the allocated graphical processing unit memory of the second resource into one or more page tables of a central processing unit, and receiving a virtual address of the graphical processing unit memory from the one or more page tables of the central processing unit. In an embodiment, a system may include a digital display and an apparatus configured to perform the method of creating a first and second resource, allocating graphical processing unit memory for the second resource, creating a link between the first resource and the second resource, mapping the allocated graphical processing unit memory of the second resource into one or more page tables of a central processing unit, and receiving a virtual address of the graphical processing unit memory from the one or more page tables of the central processing unit.

In some embodiments, a system may include a processor circuit, a digital display operatively coupled to the processor circuit and a graphics driver operative on the processor circuit to allow an application direct access to a graphical processing unit memory. The graphics driver operative to implement one or more application programming interfaces including a create resource application programming interface to designate a first resource and a second resource as shared resources, and allocate the graphical processing unit memory for the second resource, a resource copy application programming interface to create a pointer in the first resource to the second resource when the first and second resources are shared resources, or a map staging resource application programming interface to access the allocated graphical processing unit memory of the second resource via a pointer from the first resource, map the allocated graphical processing unit memory of the second resource into one or more page tables of the central processing unit, and send a virtual address of the graphical processing unit memory from the one or more page tables of the central processing unit to the application. The system may include a radio receiver operatively coupled to the processor circuit. The graphics driver may be operative to implement the resource copy application programming interface to store, in a data structure of the first resource, the pointer to a data structure of the second resource. The graphics driver may be operative to implement the map staging resource application programming interface to receive a virtual pointer with the virtual address from one or more central processing unit page tables.

What is claimed is:

1. A computer-implemented method, comprising:
creating first and second resources to allow an application direct access to graphical processing unit memory via one or more application programming interfaces, the first and second resources comprising data structures, the data structure for the first resource having a link to the data structure of the second resource, with at least one of the first and second resources allocated from the graphical processing unit memory;
accessing allocated graphical processing unit memory of the data structure of the second resource via the link from the data structure of the first resource;
mapping the allocated graphical processing unit memory into one or more page tables of a central processing unit; and
sending a virtual address of a graphical processing unit memory from the one or more page tables of the central processing unit to the application.

2. The computer-implemented method of claim 1, comprising:
allocating the graphical processing unit memory for the second resource.

3. The computer-implemented method of claim 1, comprising:
receiving a request for the application to have direct access to the graphical processing unit memory.

4. The computer-implemented method of claim 1, the first resource comprising a staging resource and the second resource comprising a non-staging resource.

5. The computer-implemented method of claim 1, comprising:
designating the first and second resources as shared resources.

6. The computer-implemented method of claim 1, comprising:
aborting an allocation of the graphical processing unit memory for the first resource when the first resource is a staging resource.

7. The computer-implemented method of claim 1, comprising:
storing, in a data structure of the first resource, a pointer to a data structure of the second resource to create the link.

8. The computer-implemented method of claim 1, comprising:
receiving the virtual address of the graphical processing unit memory from the one or more page tables of the central processing unit.

9. The computer-implemented method of claim 1, comprising:
determining whether to flush a cache of the graphical processing unit memory based on one of a read and write flag; and
determining whether to invalidate a cache of the graphical processing unit memory based on one of a read and write flag.

10. An apparatus comprising:
a processor circuit; and
a graphics driver operative on the processor circuit to:
create first and second resources to allow an application direct access to graphical processing unit memory via one or more application programming interfaces, the first and second resources comprising data structures, the data structure for the first resource having a link to the data structure of the second resource with at least one of the first and second resources allocated from the graphical processing unit memory;
access allocated graphical processing unit memory of the data structure of the second resource via the link from the data structure of the first resource;
map the allocated graphical processing unit memory into one or more page tables of the processor circuit; and
send a virtual address of a graphical processing unit memory from the one or more page tables of the processor circuit to the application.

11. The apparatus of claim 10, the graphics driver to determine whether initialization data for the second resource was specially formatted.

12. The apparatus of claim 10, the graphics driver to determine whether initialization data for the first resource was specially formatted.

13. The apparatus of claim 10, the graphics driver to abort an allocation of the graphical processing unit memory for the first resource.

14. The apparatus of claim 10, the graphics driver to store, in the data structure of the first resource, a pointer to the data structure of the second resource.

15. The apparatus of claim 10, the graphics driver to receive a virtual pointer with the virtual address from one or more processor circuit page tables.

16. The apparatus of claim 10, the graphics driver to send a virtual pointer with the virtual address to the application.

17. The apparatus of claim 10, the graphics driver to determine whether to flush a cache of the graphical processing unit memory based on a flag.

18. The apparatus of claim 10, the graphics driver to determine whether to invalidate a cache of the graphical processing unit memory based on a flag.

19. The apparatus of claim 10, the first resource comprises a staging resource and the second resource comprises a non-staging resource.

20. The apparatus of claim 10, comprising:

a digital display operatively coupled to the processor circuit.

21. At least one non-transitory, machine readable medium comprising a plurality of instructions that in response to being executed on a computing device cause the computing device to:

create first and second resources to allow an application direct access to graphical processing unit memory via one or more application programming interfaces, the first and second resources comprising data structures, with at least one of the first and second resources allocated from the graphical processing unit memory;

access allocated graphical processing unit memory of the data structure of the second resource from the data structure of the first resource;

map the allocated graphical processing unit memory into one or more page tables of a central processing unit; and send a virtual address of a graphical processing unit memory from the one or more page tables of the central processing unit.

22. The at least one machine readable medium of claim 21, comprising a plurality of instructions that in response to being executed on a computing device cause the computing device to receive a request for an application to have direct access to the graphical processing unit memory.

23. The at least one machine readable medium of claim 21, comprising a plurality of instructions that in response to being executed on a computing device cause the computing device to store, in a data structure of the first resource, a pointer to a data structure of the second resource to create a link between the first resource and the second resource.

* * * * *